United States Patent
Petit

(10) Patent No.: US 11,835,593 B2
(45) Date of Patent: Dec. 5, 2023

(54) MULTI-PHASE SIMULATION ENVIRONMENT

(71) Applicant: SENTIENT TECHNOLOGY HOLDINGS, LLC, Witchita, KS (US)

(72) Inventor: Steven Charles Petit, San Jose, CA (US)

(73) Assignee: SENTIENT TECHNOLOGY HOLDINGS, LLC, Wichita, KS (US)

( * ) Notice: Subject to any disclaimer, the term of this patent is extended or adjusted under 35 U.S.C. 154(b) by 0 days.

(21) Appl. No.: 18/072,729

(22) Filed: Dec. 1, 2022

(65) Prior Publication Data

US 2023/0128209 A1    Apr. 27, 2023

Related U.S. Application Data

(63) Continuation of application No. 17/468,660, filed on Sep. 7, 2021, now Pat. No. 11,549,997, which is a continuation of application No. 16/714,541, filed on Dec. 13, 2019, now Pat. No. 11,125,832.

(60) Provisional application No. 62/779,305, filed on Dec. 13, 2018.

(51) Int. Cl.
  *G01R 31/40*  (2020.01)
  *G01R 19/25*  (2006.01)

(52) U.S. Cl.
  CPC ......... *G01R 31/40* (2013.01); *G01R 19/2513* (2013.01)

(58) Field of Classification Search
  CPC ..... G01R 31/40; G01R 19/2513; Y04S 40/20; Y02E 60/00; G06F 30/367; G06F 2113/04

USPC ..................................................... 324/764.01
See application file for complete search history.

(56) References Cited

U.S. PATENT DOCUMENTS

| | | | |
|---|---|---|---|
| 3,075,166 A | 1/1963 | Peek | |
| 3,558,984 A | 1/1971 | Smith | |
| 3,676,740 A | 7/1972 | Schweitzer, Jr. | |
| 3,686,531 A | 8/1972 | Decker | |
| 3,702,966 A | 11/1972 | Schweitzer, Jr. | |
| 3,708,724 A | 1/1973 | Schweitzer | |
| 3,715,742 A | 2/1973 | Schweitzer | |
| 3,720,872 A | 3/1973 | Russell | |

(Continued)

FOREIGN PATENT DOCUMENTS

| | | |
|---|---|---|
| EP | 1508146 A2 | 2/2005 |
| EP | 1938159 A1 | 7/2008 |

(Continued)

OTHER PUBLICATIONS

Giampaolo Buticchi et al., Analysis of the frequency-based control of a master/slave micro-grid, 10 IET Renewable Power Generation 1570 (available at https://doi.org/10.1049/iet-rpg.2016.0167, last accessed Aug. 11, 2023) (Year: 2016).*

(Continued)

*Primary Examiner* — Tung X Nguyen
*Assistant Examiner* — Robert P Alejnikov, Jr.

(57) ABSTRACT

A Multi-Phase Simulation Environment ("MPSE") is provided. In one embodiment, a simulation environment controller is configured to select a waveform from a waveform playlist and initiate a trigger signal to one or more waveform generators of a plurality of waveform generators to generate the waveform. The plurality of waveform generators are configured to generate the waveform under a phase lock.

20 Claims, 5 Drawing Sheets

(56) References Cited

U.S. PATENT DOCUMENTS

| | | |
|---|---|---|
| 3,725,832 A | 4/1973 | Schweitzer |
| 3,755,714 A | 8/1973 | Link |
| 3,768,011 A | 10/1973 | Swain |
| 3,777,217 A | 12/1973 | Groce |
| 3,814,831 A | 6/1974 | Olsen |
| 3,816,816 A | 6/1974 | Schweitzer |
| 3,866,197 A | 2/1975 | Schweitzer, Jr. |
| 3,876,911 A | 4/1975 | Schweitzer, Jr. |
| 3,957,329 A | 5/1976 | Mcconnell |
| 3,970,898 A | 7/1976 | Baumann |
| 4,063,161 A | 12/1977 | Pardis |
| 4,152,643 A | 5/1979 | Schweitzer, Jr. |
| 4,339,792 A | 7/1982 | Yasumura |
| 4,378,525 A | 3/1983 | Burdick |
| 4,396,794 A | 8/1983 | Stiller |
| 4,396,968 A | 8/1983 | Stiller |
| 4,398,057 A | 8/1983 | Shankle |
| 4,408,155 A | 10/1983 | Mcbride |
| 4,466,071 A | 8/1984 | Russell, Jr. |
| 4,559,491 A | 12/1985 | Saha |
| 4,570,231 A | 2/1986 | Bunch |
| 4,584,523 A | 4/1986 | Elabd |
| 4,649,457 A | 3/1987 | Talbot |
| 4,654,573 A | 3/1987 | Rough |
| 4,709,339 A | 11/1987 | Fernandes |
| 4,714,893 A | 12/1987 | Smith-vaniz |
| 4,723,220 A | 2/1988 | Smith-vaniz |
| 4,728,887 A | 3/1988 | Davis |
| 4,746,241 A | 5/1988 | Burbank, III |
| 4,766,549 A | 8/1988 | Schweitzer, III |
| 4,775,839 A | 10/1988 | Kosina |
| 4,808,916 A | 2/1989 | Smith-vaniz |
| 4,829,298 A | 5/1989 | Fernandes |
| 4,881,028 A | 11/1989 | Bright |
| 4,886,980 A | 12/1989 | Fernandes |
| 4,904,932 A | 2/1990 | Schweitzer, Jr. |
| 4,937,769 A | 6/1990 | Verbanets |
| 5,006,846 A | 4/1991 | Granville |
| 5,125,738 A | 6/1992 | Kawamura |
| 5,138,265 A | 8/1992 | Kawamura |
| 5,159,561 A | 10/1992 | Watanabe |
| 5,181,026 A | 1/1993 | Granville |
| 5,182,547 A | 1/1993 | Griffith |
| 5,202,812 A | 4/1993 | Shinoda |
| 5,206,595 A | 4/1993 | Wiggins |
| 5,220,311 A | 6/1993 | Schweitzer, Jr. |
| 5,428,549 A | 6/1995 | Chen |
| 5,438,256 A | 8/1995 | Thuries |
| 5,473,244 A | 12/1995 | Libove |
| 5,495,169 A | 2/1996 | Smith |
| 5,550,476 A | 8/1996 | Lau |
| 5,565,783 A | 10/1996 | Lau |
| 5,600,248 A | 2/1997 | Westrom |
| 5,608,328 A | 3/1997 | Sanderson |
| 5,650,728 A | 7/1997 | Rhein |
| 5,656,931 A | 8/1997 | Lau |
| 5,682,100 A | 10/1997 | Rossi |
| 5,696,788 A | 12/1997 | Choi |
| 5,712,796 A | 1/1998 | Ohura |
| 5,729,144 A | 3/1998 | Cummins |
| 5,737,203 A | 4/1998 | Barrett |
| 5,764,065 A | 6/1998 | Richards |
| 5,839,093 A | 11/1998 | Novosel |
| 5,892,430 A | 4/1999 | Wiesman |
| 5,905,646 A | 5/1999 | Crewson |
| 5,990,674 A | 11/1999 | Schweitzer, Jr. |
| 6,002,260 A | 12/1999 | Lau |
| 6,016,105 A | 1/2000 | Schweitzer, Jr. |
| 6,043,433 A | 3/2000 | Schweitzer, Jr. |
| 6,133,723 A | 10/2000 | Feight |
| 6,133,724 A | 10/2000 | Schweitzer, Jr |
| 6,288,632 B1 | 9/2001 | Hoctor |
| 6,292,340 B1 | 9/2001 | Oregan |
| 6,347,027 B1 | 2/2002 | Nelson |
| 6,433,698 B1 | 8/2002 | Schweitzer, Jr. |
| 6,459,998 B1 | 10/2002 | Hoffman |
| 6,466,030 B2 | 10/2002 | Hu |
| 6,466,031 B1 | 10/2002 | Hu |
| 6,477,475 B1 | 11/2002 | Takaoka |
| 6,483,435 B2 | 11/2002 | Saha |
| 6,549,880 B1 | 4/2003 | Willoughby |
| 6,559,651 B1 | 5/2003 | Crick |
| 6,566,854 B1 | 5/2003 | Hagmann |
| 6,577,108 B2 | 6/2003 | Hubert |
| 6,601,001 B1 | 7/2003 | Moore |
| 6,622,285 B1 | 9/2003 | Rust |
| 6,677,743 B1 | 1/2004 | Coolidge |
| 6,718,271 B1 | 4/2004 | Tobin |
| 6,734,662 B1 | 5/2004 | Fenske |
| 6,734,669 B2 | 5/2004 | Lopez |
| 6,798,211 B1 | 9/2004 | Rockwell |
| 6,822,457 B2 | 11/2004 | Borchert |
| 6,822,576 B1 | 11/2004 | Feight |
| 6,879,917 B2 | 4/2005 | Turner |
| 6,894,478 B1 | 5/2005 | Fenske |
| 6,914,763 B2 | 7/2005 | Reedy |
| 6,917,888 B2 | 7/2005 | Logvinov |
| 6,927,672 B2 | 8/2005 | Zalitzky |
| 6,949,921 B1 | 9/2005 | Feight |
| 6,963,197 B1 | 11/2005 | Feight |
| 6,980,090 B2 | 12/2005 | Mollenkopf |
| 7,023,691 B1 | 4/2006 | Feight |
| 7,046,124 B2 | 5/2006 | Cope |
| 7,053,601 B1 | 5/2006 | Fenske |
| 7,072,163 B2 | 7/2006 | Mccollough, Jr. |
| 7,076,378 B1 | 7/2006 | Huebner |
| 7,085,659 B2 | 8/2006 | Peterson |
| 7,106,048 B1 | 9/2006 | Feight |
| 7,158,012 B2 | 1/2007 | Wiesman |
| 7,187,275 B2 | 3/2007 | Mccollough, Jr. |
| 7,203,622 B2 | 4/2007 | Pan |
| 7,272,516 B2 | 9/2007 | Wang |
| 7,295,133 B1 | 11/2007 | Mccollough, Jr. |
| 7,400,150 B2 | 7/2008 | Cannon |
| 7,424,400 B2 | 9/2008 | Mccormack |
| 7,449,991 B2 | 11/2008 | Mollenkopf |
| 7,450,000 B2 | 11/2008 | Gidge |
| 7,508,638 B2 | 3/2009 | Hooper |
| 7,518,529 B2 | 4/2009 | Osullivan |
| 7,532,012 B2 | 5/2009 | Cern |
| 7,557,563 B2 | 7/2009 | Gunn |
| 7,626,794 B2 | 12/2009 | Swartzendruber |
| 7,633,262 B2 | 12/2009 | Lindsey |
| 7,672,812 B2 | 3/2010 | Stoupis |
| 7,683,798 B2 | 3/2010 | Rostron |
| 7,701,356 B2 | 4/2010 | Curt |
| 7,714,592 B2 | 5/2010 | Radtke |
| 7,720,619 B2 | 5/2010 | Hou |
| 7,725,295 B2 | 5/2010 | Stoupis |
| 7,742,393 B2 | 6/2010 | Bonicatto |
| 7,764,943 B2 | 7/2010 | Radtke |
| 7,795,877 B2 | 9/2010 | Radtke |
| 7,795,994 B2 | 9/2010 | Radtke |
| 7,804,280 B2 | 9/2010 | Deaver, Sr. |
| 7,930,141 B2 | 4/2011 | Banting |
| 8,421,444 B2 | 4/2013 | Gunn |
| 8,497,781 B2 | 7/2013 | Engelhardt |
| 8,594,956 B2 | 11/2013 | Banting |
| 8,786,292 B2 | 7/2014 | Parsons |
| 9,182,429 B2 | 11/2015 | Saxby |
| 9,229,036 B2 | 1/2016 | Kast |
| 9,448,257 B2 | 9/2016 | Saxby et al. |
| 9,581,624 B2 | 2/2017 | Rostron et al. |
| 9,954,354 B2 | 4/2018 | Baker |
| 9,984,818 B2 | 5/2018 | Rumrill |
| 11,041,915 B2 | 6/2021 | Rumrill |
| 2004/0156154 A1 | 8/2004 | Lazarovich |
| 2005/0073200 A1 | 4/2005 | Divan |
| 2008/0077336 A1 | 3/2008 | Fernandes |
| 2009/0058582 A1 | 3/2009 | Webb |
| 2009/0192777 A1* | 7/2009 | Clement ............... G06F 30/367 703/16 |
| 2009/0309754 A1 | 12/2009 | Bou |
| 2010/0085036 A1 | 4/2010 | Banting |

(56) References Cited

U.S. PATENT DOCUMENTS

| | | | |
|---|---|---|---|
| 2011/0032739 A1 | 2/2011 | Juhlin | |
| 2011/0251732 A1* | 10/2011 | Schweitzer, III | H02J 13/00006 |
| | | | 700/297 |
| 2012/0039062 A1 | 2/2012 | Mcbee | |
| 2012/0236611 A1 | 9/2012 | Alexandrov | |
| 2013/0162136 A1 | 6/2013 | Baldwin | |
| 2014/0062221 A1 | 3/2014 | Papastergiou | |
| 2014/0145858 A1 | 5/2014 | Miller | |
| 2014/0174170 A1 | 6/2014 | Davis | |
| 2014/0192458 A1 | 7/2014 | Valdes | |
| 2014/0226366 A1 | 8/2014 | Morokuma | |
| 2014/0260598 A1 | 9/2014 | Miller | |
| 2015/0198667 A1 | 7/2015 | Krekeler et al. | |
| 2016/0116505 A1 | 4/2016 | Kast et al. | |
| 2016/0337048 A1* | 11/2016 | Hsueh | H04B 17/104 |
| 2017/0199533 A1 | 7/2017 | Mccollough | |
| 2018/0143234 A1 | 5/2018 | Saxby | |
| 2020/0088772 A1 | 3/2020 | Rumrill | |
| 2020/0091721 A1 | 3/2020 | Rumrill | |
| 2020/0116772 A1 | 4/2020 | Pierce et al. | |
| 2020/0174048 A1 | 6/2020 | Reader et al. | |
| 2020/0287410 A1* | 9/2020 | Zhao | H02J 13/00032 |

FOREIGN PATENT DOCUMENTS

| | | | |
|---|---|---|---|
| EP | 2340592 A1 | 7/2011 | |
| EP | 2350764 A1 | 8/2011 | |

OTHER PUBLICATIONS

Girish G. Talapur et al., Master-slave control based reliable micro-Grid with back-to-back voltage source converter as master DG, 2017 IECON 310 (available at https://ieeexplore.ieee.org/abstract/document/8216056, last accessed Aug. 11, 2023) (Year: 2017).*

Buticchi et al., Analysis of the frequency-based control of a master/slave micro-grid, IET Renewable Power Generation, vol. 10, Issue 10, 2016, pp. 1570-1576.

Chen et al., "Development of arc-guided protection devices against lightning breakage of covered conductors on distribution lines", IEEE Trans. Power Deliv., 25(1), Jan. 2010, pp. 196-205.

Chen Yang Technologies, "Split core hall effect dc current sensor CYHCT-C2TC", 4 pages; retrieved from the internet Jan. 5, 2015 (http://www.hallsensors.de/CYHCT-C2TC.pdf) (Product Information).

Saha et al., "Fault Location on Power Networks (Power Systems)", Springer Verlag; London, UK; 435 pgs.; 2010 (Preface: Oct. 2009).

Shepard et al., "An overview of rogowski coil current sensing technology", 13 pages, retrieved from the internet Jan. 5, 2016 (http://www.dynamp.net/ldadocum.nsf/c2270fbdd892ac3e86256e75000ad88a/e710af6d3e0f6255862565d7004b19db/SFILE/Report.pdf).

Stringfield et al., "Fault location methods for overhead lines", in Transactions of the American Institute of Electrical Engineers; Amer. Inst. of Electrical Eng.; New York, NY; Part. III; vol. 76; Aug. 1957, pp. 518-530.

Talapur, et al., Master-slave control based reliable micro-Grid with back-to-back voltage source converter as master DG, IEEE, 2017, pp. 310-315.

* cited by examiner

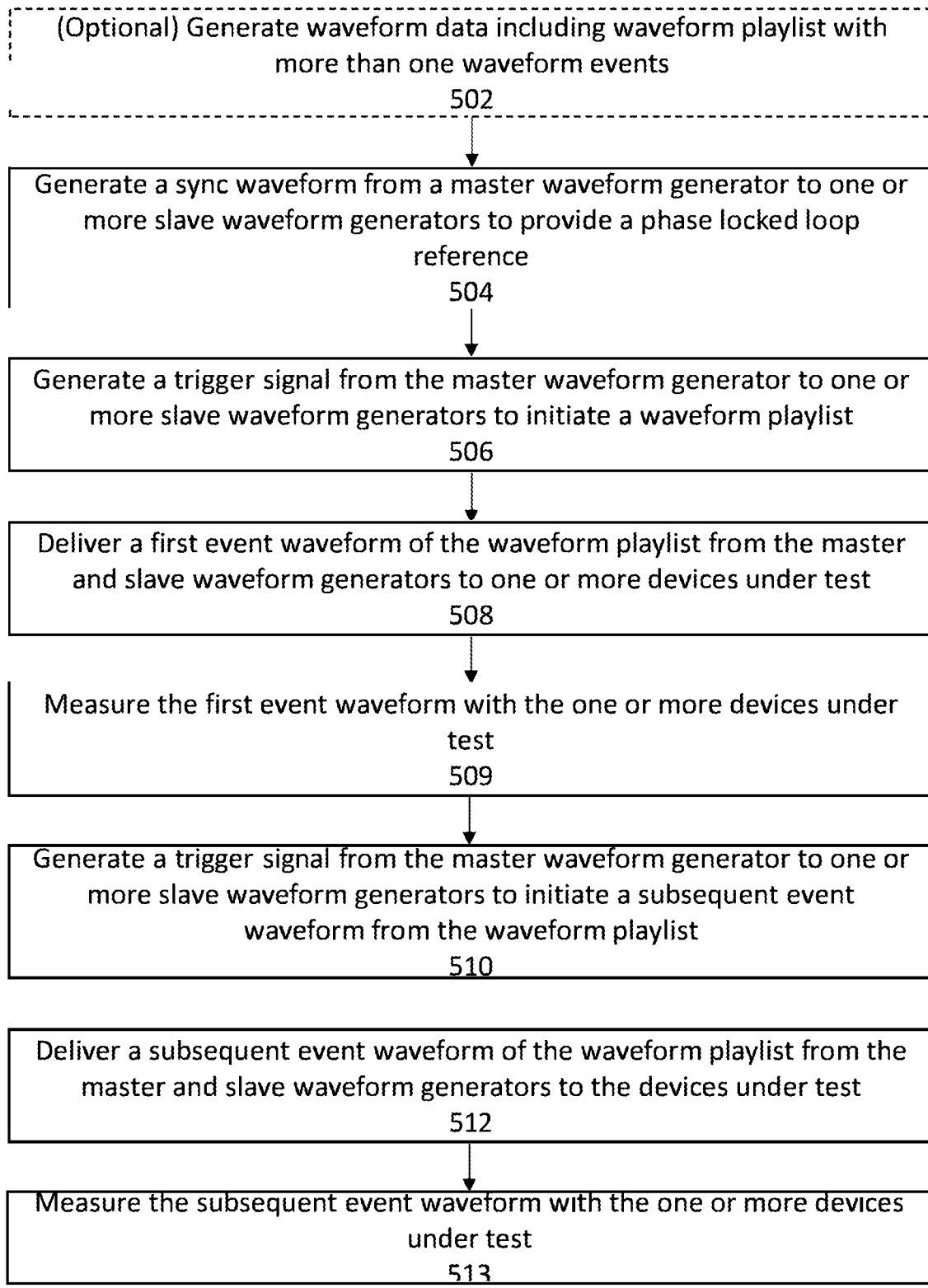

MULTI-PHASE SIMULATION ENVIRONMENT

CROSS REFERENCE TO RELATED APPLICATIONS

This application is a continuation of U.S. patent application Ser. No. 17/468,660, filed Sep. 7, 2021, titled "Multi-Phase Simulation Environment," which is a continuation of U.S. patent application Ser. No. 16/714,541, filed Dec. 13, 2019, titled "Multi-Phase Simulation Environment," which issued as U.S. Pat. No. 11,125,832 on Sep. 21, 2021, and which claims the benefit of U.S. Provisional Patent Application No. 62/779,305, filed Dec. 13, 2018, and titled "Multi-Phase Simulation Environment." The contents of each of the aforementioned applications are incorporated by reference herein.

INCORPORATION BY REFERENCE

All publications and patent applications mentioned in this specification are herein incorporated by reference to the same extent as if each individual publication or patent application was specifically and individually indicated to be incorporated by reference.

FIELD

The present application relates generally to distribution line monitoring, sensor monitoring, and sensing and identifying electrical characteristics of a power distribution line. More specifically, the present disclosure relates to testing devices for simulating electrical characteristics of an electrical grid to test line sensing devices for quality control or new features.

BACKGROUND

In providing power to customers, electrical power utility companies employ a power grid distribution network that includes distribution-line-conductors (which are often referred to as power lines). Typically, difficulties or faults within the distribution network are identified only after occurrences of "events." These events may merely result in a temporary loss of power for a limited number of customers, but more significant problems may occur.

Protection components and systems are known. "Reactive" components are particularly common. A reactive component is a device or system that is activated or deactivated by a fault event or its consequences. For example, a circuit breaker will open a transmission line as a response to excessive current, thereby protecting power distribution equipment. More sophisticated systems are also available.

Clearly, there are benefits to identifying conditions that precede fault events. For example, if it can be determined that a power line from a power transformer is experiencing intermittent fluctuations, scheduling a replacement of the transformer to avoid an outage event would be beneficial to the utility provider and its customers. Thus, "predictive" components and systems are desirable. Monitoring systems that monitor power parameters of equipment and power lines can provide useful information for the prevention and identification of power distribution faults or events.

Line monitoring devices typically take the form of a sensor monitoring the electric current and electric field ("E-field") or voltage of a conductor in the utility network, and provide output data consisting of measurements and analysis of the conductor via wireless network (mesh FLAN, cellular WWAN, or "WAN"). In addition to providing location data, the use of GPS by these sensors provides a precise timing reference which enables coordination of measurement activity across a widely deployed population of sensors which otherwise share no common direct connection. The output data from each sensor is typically returned to a "back-end" management system, which stores the data for further analysis, management display, etc.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 5 is a flowchart describing a method for simulating and measuring electrical characteristics of a power grid network.

SUMMARY OF THE DISCLOSURE

Figure 1:
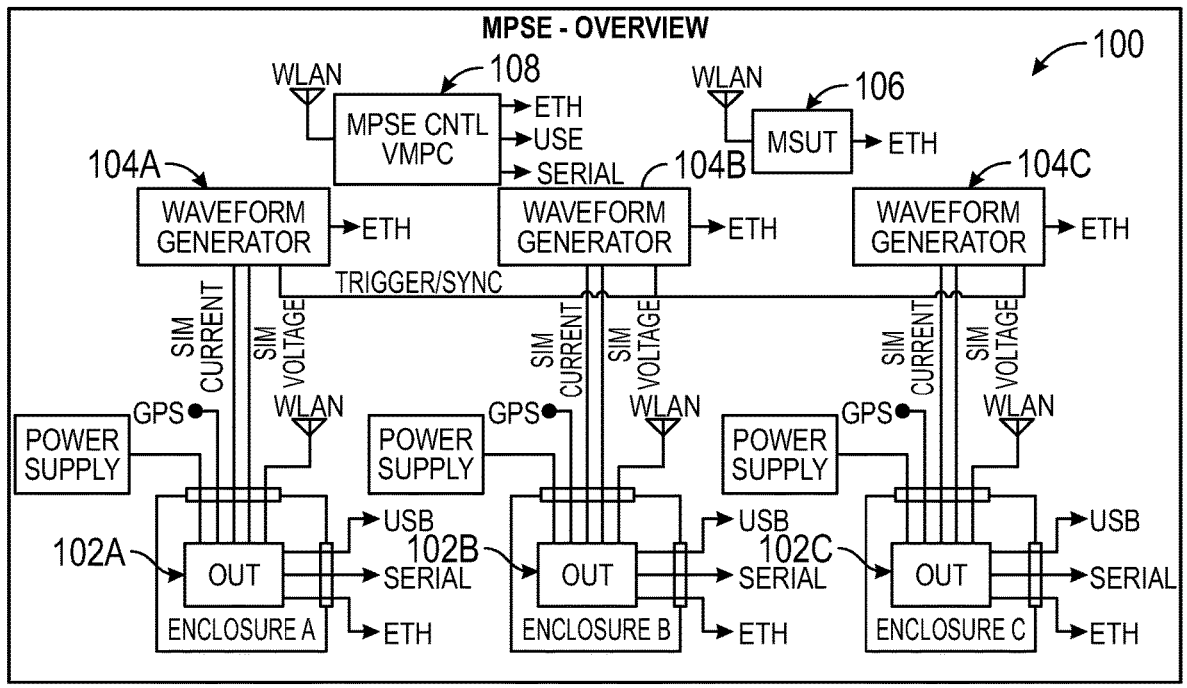
FIG. 1 is a schematic diagram of a MPSE system.

A method for simulating and measuring electrical characteristics of a power grid network is provided, comprising the steps of generating a sync waveform from a master waveform generator to one or more slave waveform generators to provide a phase locked loop reference between the master waveform generator and the one or more slave waveform generators, generating a trigger signal from the master waveform generator to the one or more slave waveform generators to initiate a first event waveform of a waveform playlist, delivering the first event waveform of the waveform playlist from the master waveform generator and the one or more slave waveform generators to one or more devices under test, measuring electrical characteristics of the first event waveform with the one or more devices under test, generating a trigger signal from the master waveform generator to the one or more slave waveform generators to initiate a subsequent event waveform of the waveform playlist, delivering the subsequent event waveform of the waveform playlist from the master waveform generator and the one or more slave waveform generators to the one or more devices under test, and measuring electrical characteristics of the subsequent event waveform with the one or more devices under test.

In some examples, the method further comprises measuring electrical characteristics of the first event waveform and the subsequent event waveform with an oscilloscope. The method can further comprise comparing the electrical characteristics measured by the oscilloscope to the electrical characteristics measured by the one or more devices under test.

In some embodiments, the first event waveform comprises a simulated current signal and a simulated voltage signal. In one embodiment, the measured electrical characteristics of the first event waveform comprise a simulated conductor current and an electric field signal.

In some embodiments, the sync waveform comprises a square wave shared among the master and slave waveform generators.

In some examples, the one or more devices under test comprise one or more power line monitoring sensors.

In one embodiment, the first event waveform comprises a background waveform that represents typical waveform characteristics of a normally operating power grid. In another embodiment, the subsequent event waveform comprises an event waveform that represents a fault, disturbance, or power outage of a power grid.

In some examples, the first event waveform is delivered from the master waveform generator and the one or more slave waveform generators in the phase locked loop reference.

A power grid simulation system is also provided, comprising a first device under test configured to measure electrical characteristics on a first conductor, a second device under test configured to measure electrical characteristics on a second conductor, a master waveform generator electrically coupled to the first device under test, the master waveform generator being configured to apply a first simulated current and a first simulated voltage on the first conductor to the first device under test, a slave waveform generator electrically coupled to the second device under test, the master waveform generator being configured to apply a second simulated current and a second simulated voltage on the second conductor to the second device under test, wherein the master waveform generator is configured to generate a trigger signal from to the slave waveform generator to initiate a first event waveform and a subsequent event waveform of a waveform playlist, and wherein the master waveform generator and the slave waveform generator are configured to deliver the first event waveform and the subsequent event waveform of the waveform playlist to the first and second devices under test in a phase locked loop.

The system can further include an oscilloscope configured to measure electrical characteristics of the first event waveform and the subsequent event waveform.

In some examples, the system further comprises a central processing unit configured to compare the electrical characteristics measured by the oscilloscope to the electrical characteristics measured by the first and second devices under test.

In one embodiment, the first event waveform comprises a simulated current signal and a simulated voltage signal.

In some examples, the measured electrical characteristics of the first event waveform and the subsequent event waveform comprise a simulated conductor current and an electric field signal.

In one embodiment, the master waveform generator is further configured to provide a sync waveform to keep the master waveform generator and the slave waveform generator in the phase locked loop.

In some embodiments, the first and second devices under test comprise power line monitoring sensors.

In one example, the first event waveform comprises a background waveform that represents typical waveform characteristics of a normally operating power grid.

In another embodiment, the subsequent event waveform comprises an event waveform that represents a fault, disturbance, or power outage of a power grid.

DETAILED DESCRIPTION

The present disclosure provides line monitoring sensors and testing systems that simulate the conductor current and voltage or electric field of multiple phases of an electrical power distribution network, provide independent control of wireless network connectivity for each sensing or measuring device, provide independent control of GPS RF to each device, and interface to a back-end analytics and management system. The present disclosure provides systems and methods which simulate the conductor current and voltage or electric field of multiple phases of an electrical power distribution network to one or more sensing or measuring devices for testing and quality control.

Described herein, and shown in FIG. 1, is a multi-phase simulation environment ("MPSE") 100 which provides a simulated testing environment for one or more line monitoring devices or sensors (the devices-under-test, or "DUTs") 102a, 102b, and 102c, each having their own power supply. Although three DUTs on three simulated conductors are shown in FIG. 1, it should be understood that the number of simulated conductors and devices-under-test may be scaled up arbitrarily.

The MPSE as disclosed herein includes waveform generator(s) 104a, 104b, and 104c electrically coupled to each DUT to provide a simulated current and simulated voltage to each corresponding DUT. The waveform generators further provide trigger and sync waveforms between the waveform generators which enables independent 360° control of the phase angle of each simulated conductor within a single common angular frame of reference, so that the real-time phase relationships between all simulated conductors may be controlled and maintained. This enables running test scenarios which would not be possible if the phase relationships between multiple individual conductors could not be controlled and maintained. In one example, the sync waveform can be a 10 mhz square wave that is shared among the waveform generators. The sync waveform provides a common phase locked loop reference.

The present disclosure provides systems and methods by which an array of line monitoring devices or sensors (the devices under test, or DUT) and the back-end analytics and management system (the management-system-under-test, or "MSUT") 106 may be exercised in this context. A MPSE control unit 108 can be configured to setup and control the operation of the MPSE itself.

The MPSE provided herein also enables independent control of all other parameters of each simulated utility conductor, while maintaining a coordinated and coherent frame of reference over the simulated network. Furthermore, the individual control over each parameter for each simulated conductor translates to the ability to perform testing and analysis over the full range of possible scenarios, as opposed to existing test equipment which are typically limited to prescribed or standardized fault scenarios, phase values, current and voltage ranges, etc. This makes the MPSE particularly valuable in developing novel measurement and analytic techniques both at the level of the individual sensor, including hardware as well as embedded software, and in the realm of the back-end analytics and management system, in particular where these techniques rely on some form of coordination across the sensor population.

The MPSE provides functionality which may not be possible with other test equipment, including off-the-shelf purpose-designed tools. In cases where there is functional overlap with existing tools, the combined cost of MPSE components may be significantly lower. In particular, the ability to simulate a scalable number of grid conductors within a coordinated frame of reference, including configuration and control over both phase relationships and the simulation and timing of events such as faults, load changes, disturbances, or other events, is unique.

Additionally, the MPSE can include a WAN control that controls the availability of WAN RF to each DUT. The WAN control may include programmatic control of RF switches or programmable attenuators. The WAN control may also control the network interface status of the MSUT and/or other network components.

The MPSE of the present disclosure can further include a GPS distribution interface to coordinate the DUTs. The GPS signal can be received by an active antenna, which may be some distance away in order to obtain clear view of the sky. The GPS signal can then distributed to each DUT individually via power dividers (and amplifiers if necessary). The GPS signal path may include RF switches or manual or programmable attenuators to enable reducing or removing GPS signal as part of test scenario.

The DUTs, or monitoring devices, are configured to be mounted to power lines or primary conductors of a power distribution network, such as a three phase AC network. The monitoring device can be configured to monitor, among other things, current flow in the simulated lines and voltage/current waveforms, conductor temperatures, ambient temperatures, vibration, and monitoring device system diagnostics. The monitoring device can further include wireless and or wired transmission (WLAN) and receiving capabilities for communication with a central server and for communications between other monitoring devices. The monitoring device can be configured to also measure the electric field surrounding the simulated lines, to record and analyze event/fault signatures, and to classify event waveforms. Current, voltage, and electric field waveform signatures can be monitored and catalogued by the monitoring device to build a comprehensive database of events, causes, and remedial actions.

The DUTs further include a plurality of power supplies (e.g., one power supply for each DUT/waveform generator). Programmable power supplies enable scenarios which include reducing or shutting off power to the DUT (which enables testing of DUT power management functions). Power may be supplied directly, or as an input to DUT power-harvesting circuitry. This may include control of power to RF components or switches for WAN/GPS.

The DUTs of the MPSE may be electrically isolated from the rest of the system. For example, each DUT may be housed inside a RF-isolating metal enclosure. The enclosures can be lined with RF-absorbing material to reduce reflection. The enclosures may further provide individual control of DUT WAN and GPS access, and prevent unwanted rebroadcast of GPS signals. Signal pass-throughs can also be provided for conductor current and E-field or voltage signals, WAN and GPS RF, USB, RS-232, and DC power.

Existing test tools may offer the ability to simulate some of these parameters, but the control range may be limited, and the total number of simulated conductors is typically limited to between one and three conductors for phase-related simulations including both current and voltage. More than one of an existing tool may be used for larger numbers of simulated conductors, but scaling in this manner would require a very high expenditure. Also, control of the phase relationship and/or sub-millisecond event timing between each of these devices may still not be possible.

The MPSE can provide testing of features including automatic phase identification, fault localization (via "last sensor" determination), disturbance detection and classification, and phase imbalance. While some aspects of these features and relevant system components can be tested or exercised individually, the end-to-end testing of these features requires the full scalability and control offered by the MPSE.

Referring to FIG. 1, the MPSE controller can be controlled via the MPSE controller 108 to select test criteria and waveform definition via either automated configuration or manual input, coordinate configuration of test equipment and DUT before, during, and after test, coordinate collection of data for post-test analysis, and include interface to test equipment, DUTs and MSUT.

Waveforms for the DUTs can be defined programmatically from stored parameters and generated by the waveform generators. A waveform sequence can be defined for each simulated conductor comprising of one or more pairs of conductor current, E-field, or voltage waveforms. Waveforms may directly represent the simulated conductor, or may be calculated to simulate, for example, Rogowski coil output corresponding to conductor current. The number of waveforms and the length of each are typically the same for all simulated conductors, while the phase angle, magnitude, harmonic content, or other parameters can be varied according to the test requirements. These waveforms can be generated as data files and are then scripted into a "playlist" of waveform events to be triggered in turn. The waveform generators can be programmatically configured at runtime with the waveform and playlist files as well as other hardware parameters.

Figure 2:
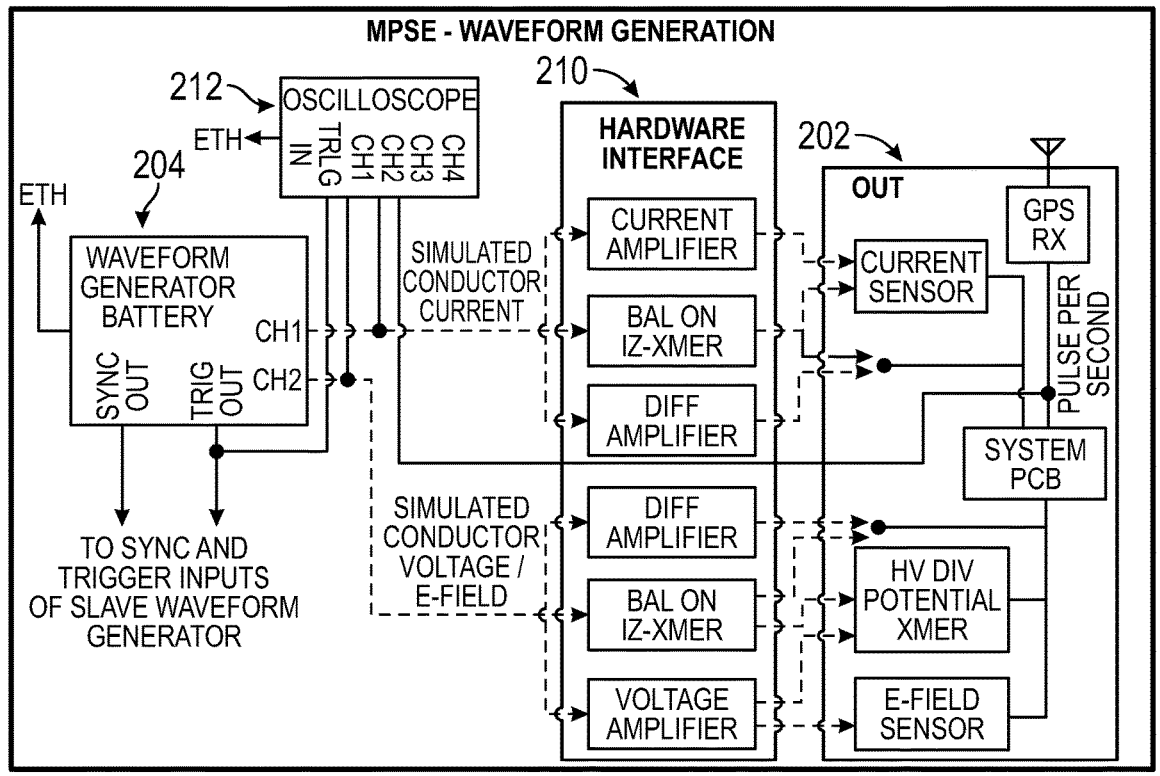
FIG. 2 is a schematic diagram illustrating waveform generation in the MPSE system described herein.

FIG. 2 is a schematic diagram illustrating waveform generation in the MPSE system described herein. As shown, the system components involved in waveform generation include, but are not limited to, one or more DUTs 202, one or more waveform generators 204, and a hardware interface 210 between the waveform generator(s) and the input of each DUT that can include, among other components, current/voltage amplifiers, baluns, and/or differential amplifiers. The hardware interface enables each waveform generator to drive a wide variety of hardware inputs not directly compatible with the generator (high current, high voltage, etc.). Several different forms of DUT interface are available, including a current amplifier to drive a Rogowski coil or other current sensing device, a high-voltage amplifier to drive a capacitive E-field sensor input, a balun or other impedance transformer to simulate potential transformer output, or a direct test input requiring simulated Rogowski coil output or other "converted" current or voltage signal analog.

An oscilloscope 212 can be connected to the various outputs of the waveform generator to accurately measure the signals produced. The oscilloscope can be connected to each waveform generator output to provide a way of recording the simulated conductor current and E-field signals. Alternately, the oscilloscope may be connected at the input to the DUT (downstream of the hardware interface 210).

In some embodiments, the waveform generators are interconnected in a master-and-slave configuration, with a single master waveform generator 204 and one or more slave waveform generators (not shown in FIG. 2). The waveform generators are configured to share: 1) a high-frequency synchronization signal, which enables maintaining phase lock between the waveform generators for extended periods, 2) a digital trigger signal, initiating each event in the "playlist" of waveforms. This can be provided to the master in the form of a SCPI command and is subsequently distributed to the slaves as a TTL pulse, resulting in near simultaneous waveform event transitions between waveform generators. Generation of the master trigger signal may include the GPS-derived pulse-per-second signal (or "PPS") as a timing reference for control of the phase relationship between PPS and the waveform generator output.

Figure 3A:
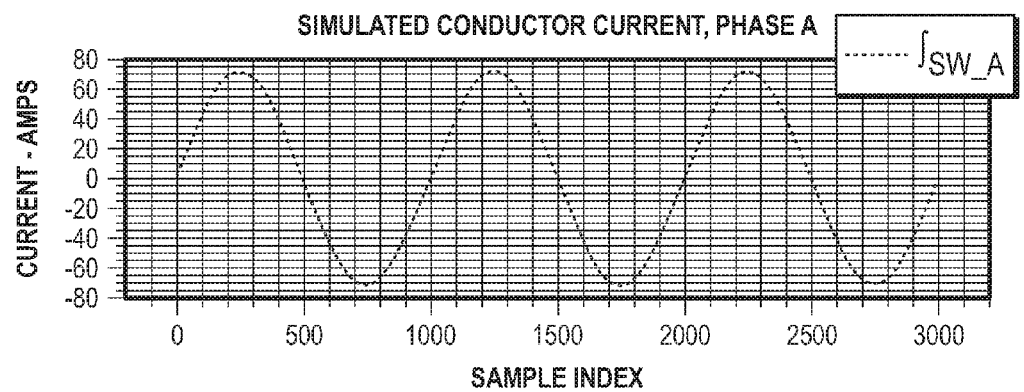
FIGS. 3A-3D are diagrams illustrating waveform generation with a master-slave waveform generator approach.
Figure 3B:
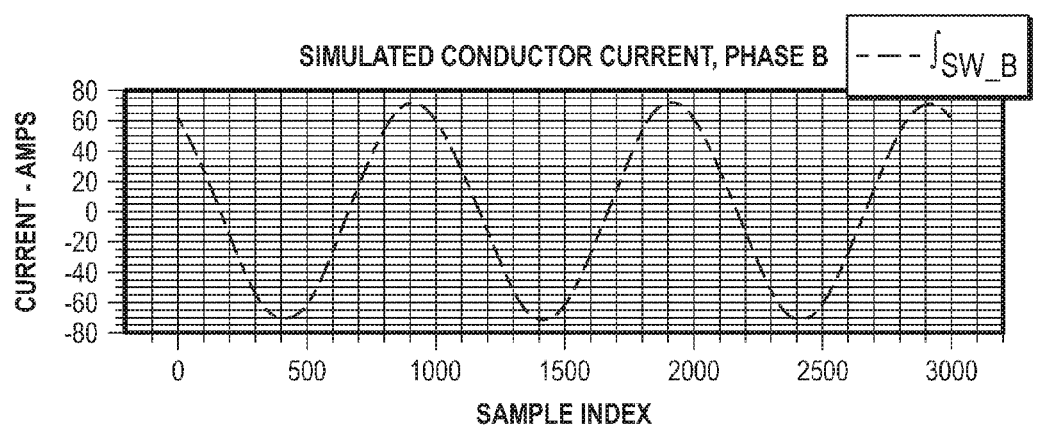
Figure 3C:
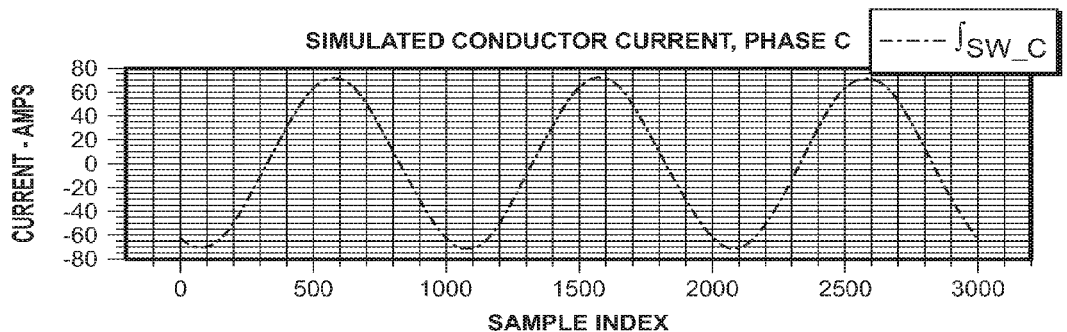
Figure 3D:
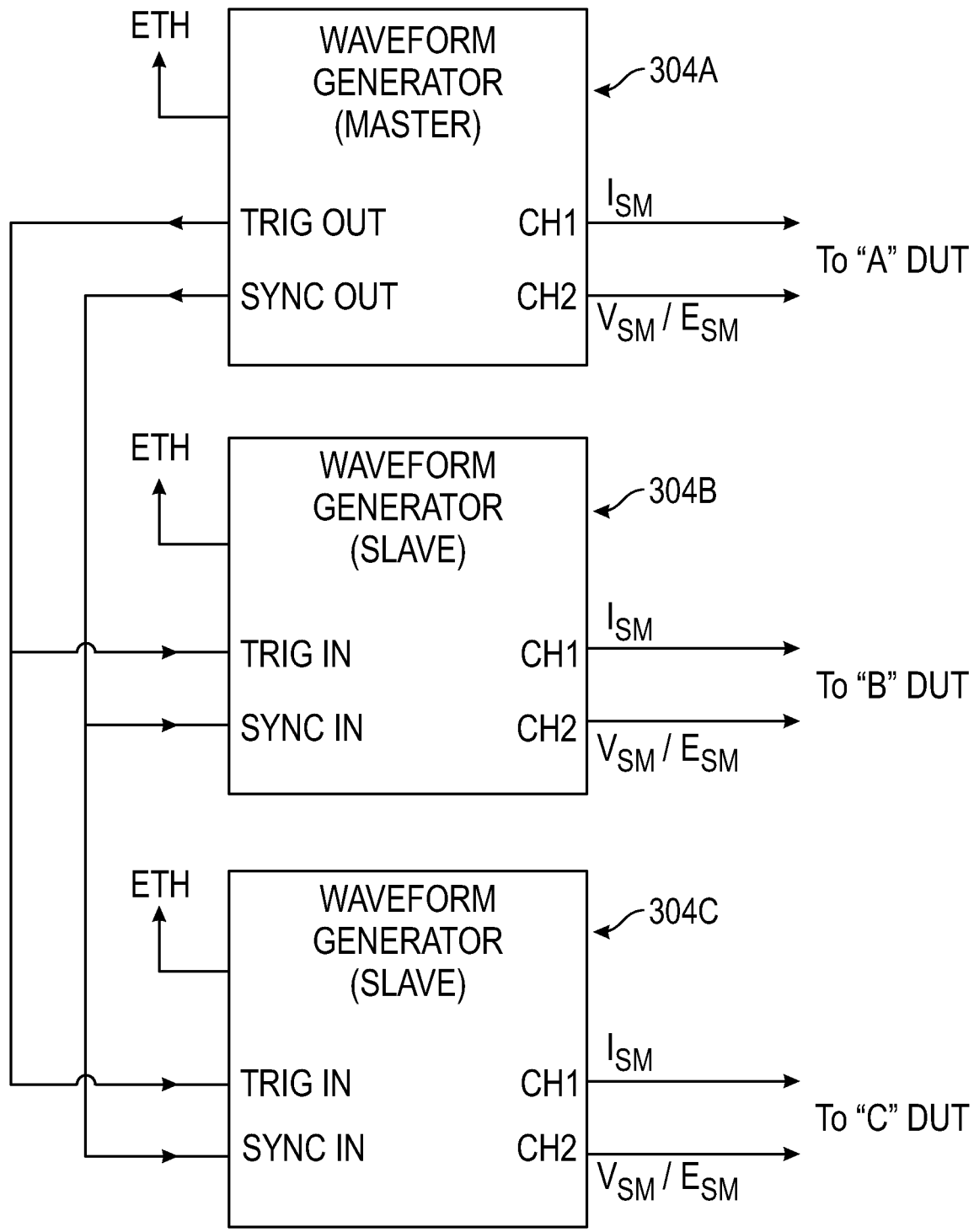

FIGS. 3A-3D illustrate waveform generation with the master-slave approach described above. Generally, waveform data is downloaded to the generators, and waveforms are constructed for each phase so that relationships between phases are built-in to the generators. FIGS. 3A-3C illustrate waveforms for the simulated conductor current of Phase A, Phase B, and Phase C, respectively. FIG. 3D illustrates a schematic diagram of the master-slave waveform generator relationship, represented by master waveform generator 304a and slave waveform generators 304b and 304c. In one example, a trigger signal is initiated to the master device 304a (such as by the MPSE controller described above), which is then passed on to the slave devices 304b and 304c with the trigger out connections between waveforms generators. This maintains the time alignment of play-listed waveforms. A syncing function enables phase-lock between waveform generators, which provides the ability to maintain phase relationships over long (multi-day) periods if desired.

Figure 4A:
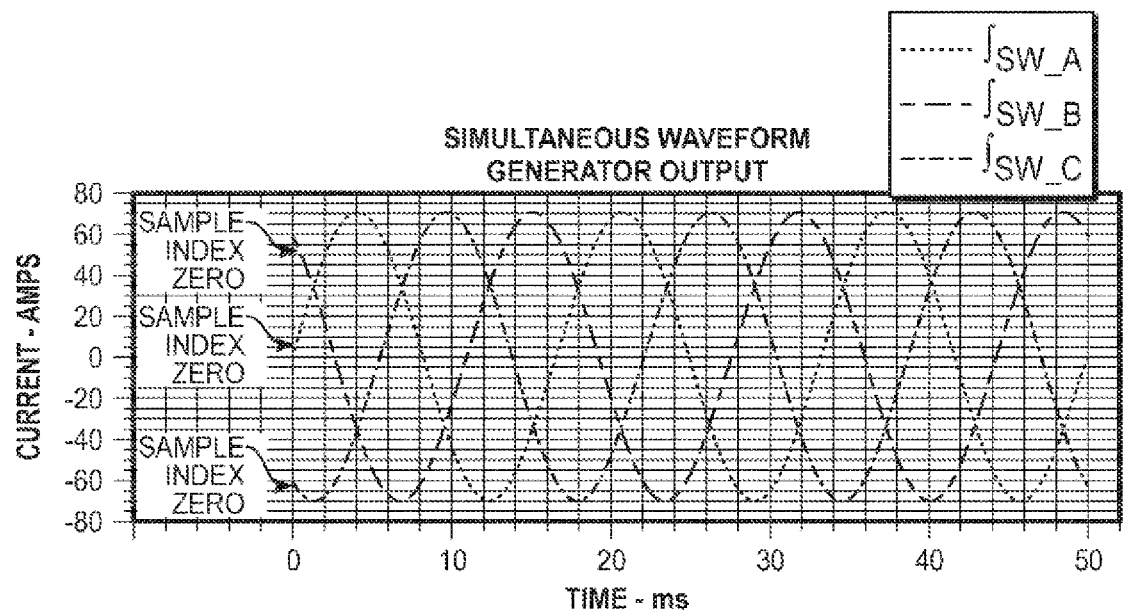
FIGS. 4A-4B are diagrams showing a way of coordinating the waveforms in the system.
Figure 4B:
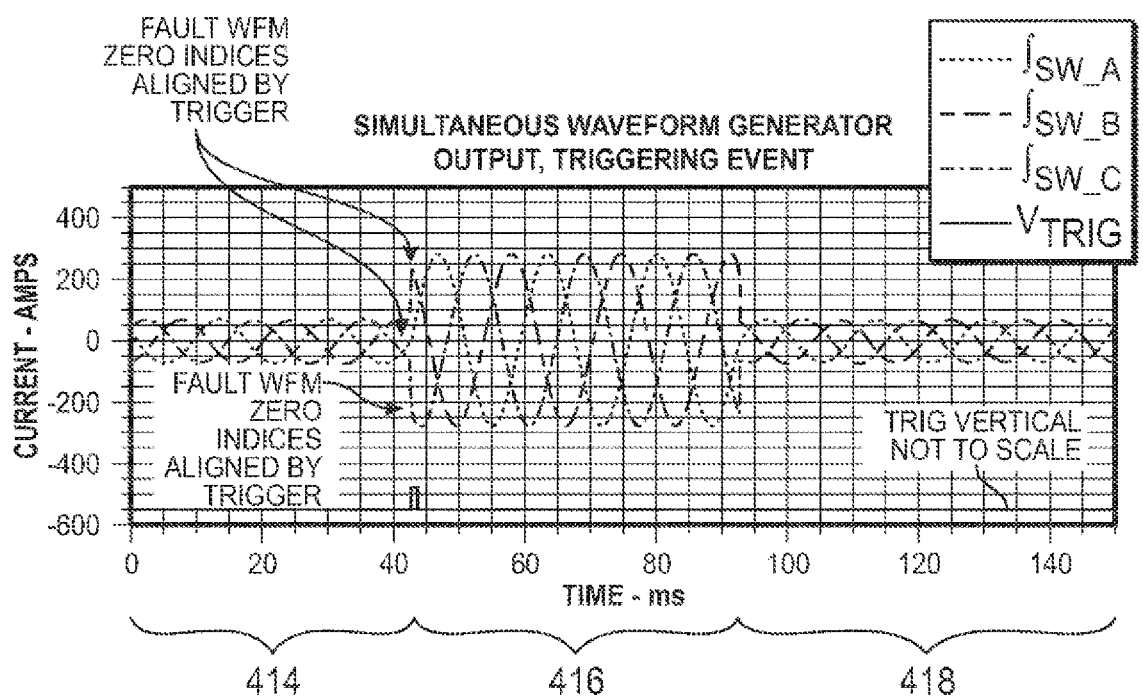

FIG. 4A is a diagram showing an example of coordinating the various phases of the conductor current waveforms in the MPSE system. FIG. 4B is one example of a waveform "playlist" including one or more "background" and "event" waveforms that are triggered by the master waveform generator (via the trigger sync) to sync the waveforms among the various waveform generators. As shown in FIG. 4B, the waveforms are designed to be part of a "playlist" sequence, which can include background and event waveforms. The waveforms represented along timescales 414 and 418 in FIG. 4B represent a "background" waveform, which can, for example, represent a typical waveform that a line monitoring device might measure on a power grid conductor during normal operation. The waveform represented along timescale 416, however, can represent an "event" waveform, which can, for example, represent a waveform that a line monitoring device might measure when there is a fault, disturbance, or power outage event on a power grid conductor. The playlist sequence may also contain elements of differing lengths. As shown, the first background waveform along timescale 414 has a different duration than the event and background waveforms along timescales 416 and 418. Individual sequence elements must be the same length for all phases (e.g., Phase A, Phase B, and Phase C). Each event can be initiated via a trigger signal from the MPSE controller and/or master waveform generator, and coordination between the waveform generators can be maintained by a combination of a shared trigger signal, an event length, a sample rate, and a phase lock.

Example Scenario

A typical scenario executed within the MPSE may proceed as follows, and as illustrated in flowchart 500 of FIG. 5: In this example, the test will target the DUTs' ability to provide independent measurement of conductor phase angle to the MSUT under a prescribed set of conditions regarding the conductors and GPS availability. Data will also be collected to evaluate the output of subsequent MSUT analysis.

The example test configuration includes three simulated conductors with one DUT assigned to each conductor, with the DUTs connected to the back-end MSUT. In this scenario, all three DUTs will have normal power, WAN, and GPS available through the test. The conductor current and E-field will be maintained at normal levels with no added noise or harmonics. The phase angles of the three simulated conductors can be arranged at intervals of 120° as a normal three-phase triplet. For each simulated conductor, the corresponding conductor current and E-field waveforms can share the same phase angle (zero reactive power).

The test begins by establishing configuration values and settings for the necessary components of the system. Relevant data is collected from the DUTs and MSUT. DUT firmware can be uploaded if necessary, and the DUTs are configured to a quiescent state. At optional step 502 of the flowchart 500, waveform data can be generated as prescribed for the waveform generators, including generating a waveform playlist with more than one waveform event.

Next, the waveform generators apply the prescribed waveform playlist to provide a simulated current and a simulated voltage to the DUTs. At step 504, a master waveform generator can initialize a sync waveform to one or more slave waveform generators to provide a common phase locked loop reference.

Next, at step 506, the method can further include generating a trigger signal from the master waveform generator to the one or more slave waveform generators to initiate waveform playlist. At step 508, the method can include delivering a first event waveform of the waveform playlist from the master and slave waveform generators to one or more devices under test. For example, the first event waveform of the waveform playlist may be a background waveform (e.g., a waveform that represents typical waveform characteristics of a normally operating power grid). At step 509, the method can include measuring the first event waveform with the one or more devices under test. Measuring can including measuring the electrical characteristics of the first event waveform, including but not limited to measuring current amplitude, phase angle, voltage amplitude, E-field, etc.

Next, at step 510, the method can further include generating a trigger signal from the master waveform generator to the one or more slave waveform generators to initiate a subsequent event waveform from the waveform playlist. At step 512, the method can include delivering a subsequent event waveform of the waveform playlist from the master and slave waveform generators to one or more devices under test. For example, the subsequent event waveform of the waveform playlist may be an event waveform (e.g., a waveform that represents a fault, disturbance, or power outage of the power grid). At step 513, the method can include measuring the subsequent event waveform with the one or more devices under test. Measuring can including measuring the electrical characteristics of the first event waveform, including but not limited to measuring current amplitude, phase, voltage amplitude, E-field, etc. Steps 510-513 can be repeated as needed to initiate, deliver, and measure all subsequent event waveforms of the waveform playlist.

During all of the method steps described above, an oscilloscope capture can be performed for comparison and analysis between the waveforms delivered by the waveform generators and the measurements from the DUTs. The MSUT can be configured process this data for analysis, display, and storage. This comparison and/or analysis can be used to identify DUTs that are not operating correctly or are providing measurements outside of an acceptable error threshold.

In some examples, the phase measurement function of the DUTs can be disabled, and output data can be collected from the DUTs and MSUT for analysis against test criteria. System components including test equipment, DUTs, and MSUT can be returned to their quiescent or default states.

The data collected in the method described above may be analyzed for test validity, qualitative or statistical analysis, and pass/fail criteria. A detailed test report and summary can be generated to represent these results.

As for additional details pertinent to the present invention, materials and manufacturing techniques may be employed as within the level of those with skill in the relevant art. The same may hold true with respect to method-based aspects of the invention in terms of additional acts commonly or logically employed. Also, it is contemplated that any optional feature of the inventive variations described may be set forth and claimed independently, or in combination with any one or more of the features described herein. Likewise, reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

What is claimed is:

1. A simulation environment controller configured to at least:
    select a waveform from a waveform playlist; and
    initiate a trigger signal to one or more waveform generators of a plurality of waveform generators to generate the waveform, the plurality of waveform generators being configured to generate the waveform under a phase lock.

2. The simulation environment controller of claim 1, wherein the one or more waveform generators are configured to pass on the trigger signal to one or more other waveform generators in the plurality of waveform generators.

3. The simulation environment controller of claim 1, wherein the waveform is calculated to simulate a Rogowski coil output corresponding to a conductor current.

4. The simulation environment controller of claim 1, wherein the waveform playlist includes at least one background waveform and at least one event waveform.

5. The simulation environment controller of claim 1, wherein the waveform playlist includes a first waveform having a first duration and a second waveform having a second duration differing from the first duration.

6. The simulation environment controller of claim 1, wherein the simulation environment controller is a particular waveform generator of the plurality of waveform generators.

7. The simulation environment controller of claim 1, wherein individual ones of the plurality of waveform generators share a synchronization signal to maintain the phase lock.

8. The simulation environment controller of claim 1, wherein the trigger signal comprises a Standard Commands for Programmable Instruments (SCPI) command.

9. The simulation environment controller of claim 1, wherein the trigger signal comprises a Transistor-to-Transistor Logic (TTL) pulse.

10. The simulation environment controller of claim 1, wherein the one or more waveform generators are coupled to a respective device under test.

11. The simulation environment controller of claim 10, wherein the respective device under test is configured to measure one or more electrical characteristics of a conductor.

12. A method, comprising:
    selecting, by a simulation environment controller, a waveform from a waveform playlist; and
    initiating, by the simulation environment controller, a trigger signal to one or more waveform generators of a plurality of waveform generators to generate the waveform, the plurality of waveform generators being configured to generate the waveform under a phase lock.

13. The method of claim 12, further comprising calculating the waveform to simulate a Rogowski coil output corresponding to a conductor current.

14. The method of claim 12, wherein the waveform playlist includes at least one background waveform and at least one event waveform, the at least one background waveform has a first duration, and the at least one event waveform has a second duration that differs from the first duration.

15. The method of claim 12, wherein the one or more waveform generators are coupled to a respective device under test.

16. The method of claim 12, further comprising distributing, by the simulation environment controller, a Global Positioning System (GPS) signal.

17. A system, comprising:
    a plurality of waveform generators;
    a simulation environment controller configured to at least:
        select a waveform from a waveform playlist; and
        initiate a trigger signal to one or more waveform generators of the plurality of waveform generators to generate the waveform; and
    wherein the plurality of waveform generators are configured to generate the waveform under a phase lock.

18. The system of claim 17, wherein individual ones of the plurality of waveform generators are coupled to a respective device under test.

19. The system of claim 17, wherein individual ones of the plurality of waveform generators share a synchronization signal to maintain the phase lock.

20. The system of claim 17, wherein the waveform playlist includes at least one background waveform and at least one event waveform, the at least one background waveform has a first duration, and the at least one event waveform has a second duration that differs from the first duration.

* * * * *